United States Patent

Seilly et al.

[11] 4,295,453
[45] Oct. 20, 1981

[54] FUEL SYSTEM FOR AN INTERNAL COMBUSTION ENGINE

[75] Inventors: Alec H. Seilly, North Wembley; Dorian F. Mowbray, Burnham; John E. Mardell, Uxbridge; Michael J. Davison, London, all of England

[73] Assignee: Lucas Industries Limited, Birmingham, England

[21] Appl. No.: 94,719

[22] Filed: Nov. 16, 1979

[30] Foreign Application Priority Data

Feb. 9, 1979 [GB] United Kingdom ................. 4724/79
Mar. 3, 1979 [GB] United Kingdom ................. 7556/79

[51] Int. Cl.³ .......................................... F02M 37/04
[52] U.S. Cl. .................................... 123/499; 123/472; 239/585; 239/88; 417/417
[58] Field of Search ............... 123/499, 497, 472, 478, 123/357; 239/585, 88, 90, 91, 93; 417/417, 416

[56] References Cited

U.S. PATENT DOCUMENTS

| 2,829,631 | 4/1958 | Wilt | 417/417 |
| 3,867,918 | 2/1975 | Williams et al. | 123/497 |
| 3,913,537 | 10/1975 | Ziesche et al. | 123/472 |
| 3,921,604 | 11/1975 | Links | 123/499 |
| 4,116,591 | 9/1978 | Mardell | 417/417 |
| 4,164,203 | 8/1979 | Cavanagh | 239/585 |

FOREIGN PATENT DOCUMENTS

| 2419425 | 11/1975 | Fed. Rep. of Germany | 239/585 |
| 1196663 | 6/1958 | France | 123/499 |

Primary Examiner—Charles J. Myhre
Assistant Examiner—Magdalen Moy

[57] ABSTRACT

A fuel system for supplying fuel to an engine includes a nozzle positioned to direct fuel into a combustion chamber and an electromagnetically operable pump for supplying fuel to the nozzle. A first electronic means supplies power to a winding of the pump to cause delivery of fuel and holds the pumping piston of the pump until it is required to fill the pumping chamber of the pump. A second electronic means partly energizes the winding or another winding when the required amount of fuel has flowed into the pumping chamber, to hold the piston against movement.

7 Claims, 6 Drawing Figures

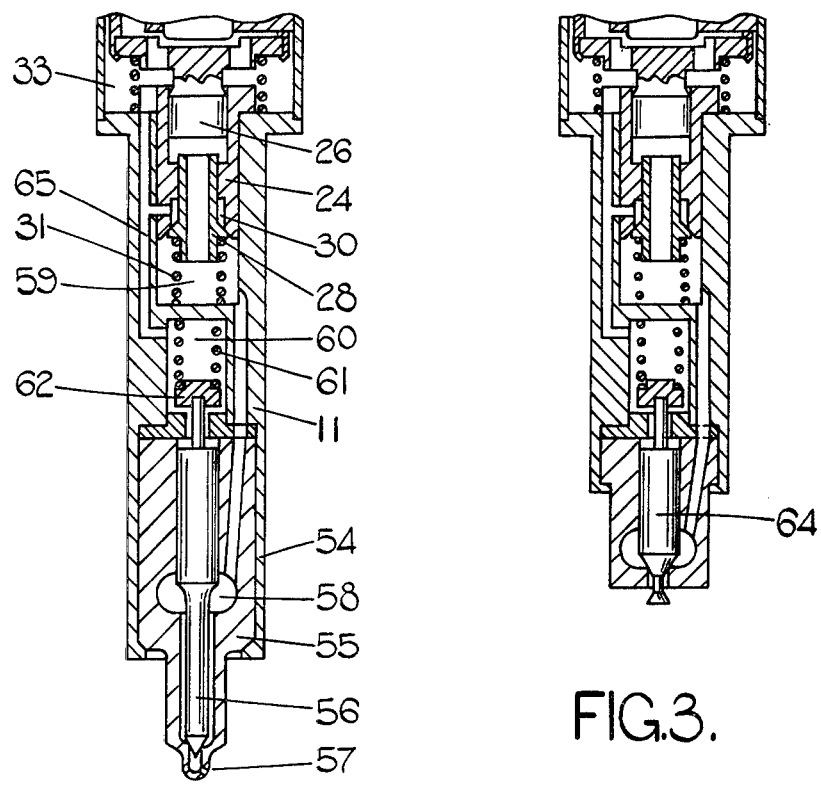

FUEL SYSTEM FOR AN INTERNAL COMBUSTION ENGINE

This invention relates to a fuel system for an internal combustion engine of the type in which fuel is injected into a combustion space of the engine, the system being of the kind comprising an injection nozzle positioned on the engine so that fuel delivered to the nozzle will be injected into the combustion space and an injection pump for delivering fuel to the nozzle in timed relationship with the associated engine.

Such systems are known for a multi cylinder engine in which a plurality of pumps are actuated by cams respectively carried by a cam shaft driven by the associated engine. The pumps are usually mounted in a common body and the output of each pump is controlled by a single control member the setting of which is determined by a mechanical governor. The pumps have to be carefully adjusted prior to use to ensure so far as is possible, that each pump delivers the same amount of fuel and at the correct time for a given setting of the control members to injection nozzles respectively on the engine. The mechanical governor must be carefully constructed to control the setting of the control rod and usually it is necessary to provide some form of timing adjusting device in the drive to the camshaft to provide timing variation in accordance at least with speed. The design and construction of the governor and timing devices is not easy particularly where great accuracy of fuel quantity and timing is required. Moreover, the provision of the drive from the engine to the camshaft often presents the engine manufacturer with design problems.

Fuel systems have been designed which attempt to overcome at least some of the problems outlined above. For example systems are known in which fuel at high pressure is stored in an accumulator and either delivered to the engine directly through the nozzles, the nozzles for this purpose employing suitable valves, or the fuel at high pressure is utilised to actuate individual pumps again under the control of valves which may be operated electrically. Such systems have the advantage over the previously described system that the control of the aforesaid valves can be effected by electronic circuits constructed to perform the governing and timing function. In this respect electronic circuits can be designed to provide more accurate control than can be obtained with the mechanical devices. However, it is still necessary to generate the high fuel pressure and the generation of the high fuel pressure is usually achieved by an engine operated pump. Moreover, the valves need to be capable of controlling the flow of fuel at high pressure and the design of such valves to ensure that they do not require much power to operate same is not easy.

The object of the present invention is to provide a fuel system of the kind specified in a simple and convenient form.

According to the invention in a fuel system of the kind specified the pump comprises a piston movable in a bore to vary the size of a pumping chamber, resilient means biasing the piston in a direction to increase the size of the pumping chamber, electromagnetic means operable to move the piston against the action of the resilient means to displace fuel from the pumping chamber through the associated nozzle, a valve controlled fuel inlet to said pumping chamber and through which fuel can flow into the bore from a source of fuel when the piston is moved by the action of the resilient means, the system including first electronic means for supplying power to the electromagnetic means for a period of time during which the piston is moved to deliver fuel from the pump, the electromagnetic means at the end of said period of time being de-energized to allow return movement of the piston under the action of the resilient means and second electronic means operable to supply a holding current to said electromagnetic means to halt the return movement of said piston after the required amount of fuel has been drawn into the pumping chamber.

An example of a fuel system in accordance with the invention will now be described with reference to the accompanying drawings in which:

FIGS. 2 and 3 are each sections through parts of the combined fuel pump and injection nozzle seen in FIG. 1 but showing modifications.

Figure 1:
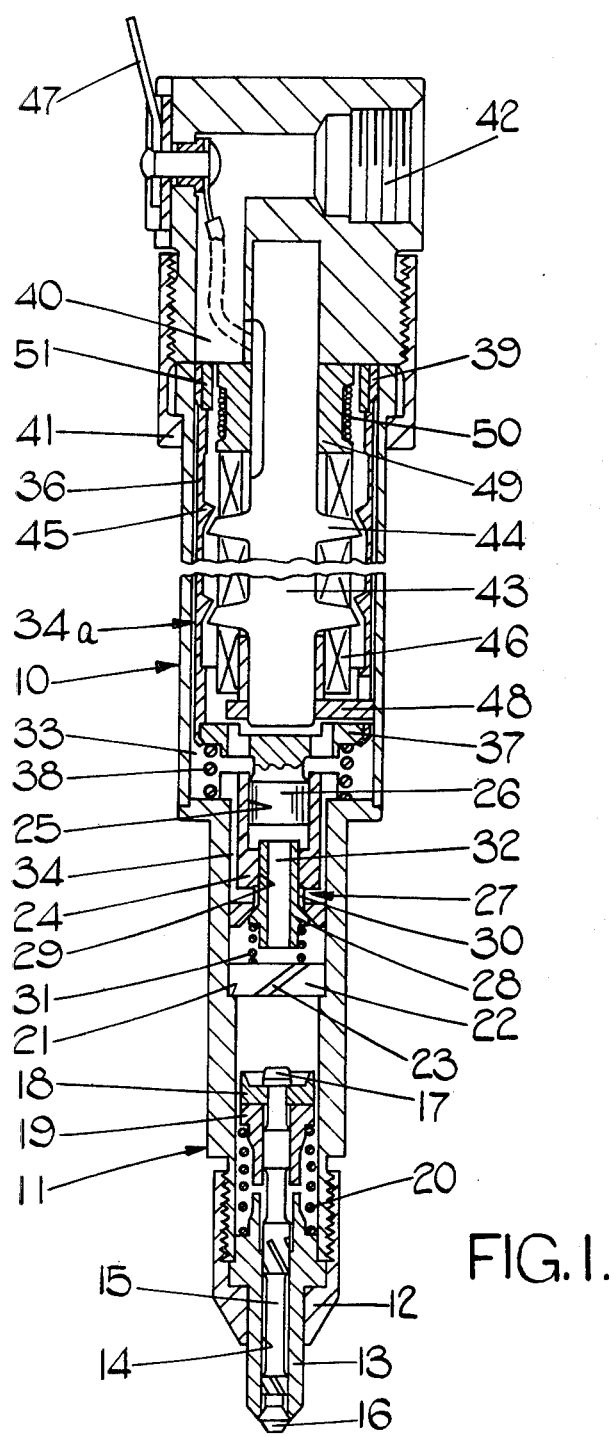
FIG. 1 is a section through a combined fuel pump and injection nozzle.

With reference to FIG. 1 of the drawings, an internal combustion engine is provided with a plurality of combined fuel pumps and injectors 10 hereinafter called pump/injectors. In use, the pump/injectors are mounted on the engine so that fuel can be injected into the combustion chambers of the engine respectively. Each pump injector 10 comprises a hollow cylindrical stepped body 11 the narrower end of which is screw threaded to receive a retaining nut 12 which retains on the body, a nozzle head 13. The nozzle head 13 has an end portion of conical form in which is defined a seating located at the end of a centrally disposed bore 14. Located within the bore is a valve member 15 which has a head 16 for co-operation with the aforesaid seating. The valve member 15 is guided for movement within the bore 14 by fluted portions integrally formed with the valve member and the diameter of the valve member is such that it can be passed through the bore 14. At its end remote from the head the valve member has a portion 17 against which is located a locking member 18 which has a lateral slot to permit it to be located about a reduced portion of the valve member beneath the portion 17. The locking member retains a spring abutment 19 in position and located between the spring abutment 19 and a portion of the nozzle head is a coiled compression spring 20 which biases the head 16 into contact with the seating.

The body 11 is provided with a central bore into which extends a portion of the nozzle head 13 and the latter is provided with a flange which is held in sealing engagement with the end of the body 11 by the retaining nut 12. Alternatively the flange may be secured by rolling a reduced end portion of the body over the flange or by electron beam welding the flange to the body.

Extending into the bore in the body 11 is a cylindrical flanged valve mounting 24. The mounting 24 is retained in the bore by means not shown and within the mounting there is formed a stepped bore. The wider portion 25 of the bore constitutes a cylinder for a piston 26. The intermediate portion 29 of the bore accommodates a valve element 27 and a slightly enlarged portion 30 of the bore is shaped at its end to define a seating for a valve head 28 forming part of the valve element 27. The valve head 28 is biased into contact with the seating by means of a light coiled compression spring 31 and extending through the valve element is a passage 32. The spring 31 seats against a member 22 which is located against a step 21 in the bore in the body, the member 22 having a peripheral groove or grooves 23 along which fuel can flow. The portion 30 of the bore communicates with a chamber 33 defined in an enlarged portion of the body 11 by way of longitudinal grooves 34 formed in the outer surface of the valve mounting and which are connected by transverse drillings to the aforesaid portion 30 of the bore.

The valve element projects into the aforesaid cylinder and it can be engaged as will be described, by the piston 26.

An electromagnetic means generally indicated at 34a, is located within the chamber 33 for moving the piston 26 in the direction to displace fuel from the cylinder 25. The electromagnetic means comprises a thin walled armature 36 this being of tubular form and being connected to a plate like part 37 which is integrally formed with the piston 26. The plate like part is provided with apertures extending therethrough to facilitate the flow of fuel and it also serves as an abutment for a coiled compression spring 38 which biases the piston 26 away from the valve element. The armature is guided for movement by the piston 26 and at its other end by an enlargement 39 slidable on the interior surface of the body 11.

The open other end of the body 11 is closed by an end closure 40 which is retained in position by means of a retaining nut 41, this engaging a flange on the body. The end closure defines a fuel inlet 42 which communicates with the chamber 33 and it also supports a stator assembly which comprises a rod 43 formed from magnetizable material. The rod 43 extends within the armature and it is provided with a pair of helical ribs 44. The interior surface of the armature is also provided with helical ribs 45 and the presented surfaces of the ribs 44 and 45 are inclined to the longitudinal axis of the pump/injector. In addition the surfaces are spaced from each other in the de-energized condition (as shown) of the electromagnetic means.

In the two grooves defined between the ribs 44 is located a pair of windings 46. The windings conveniently are formed by winding wire along one groove from one end of the rod and returning along the other groove to the same end of the rod. The windings have a plurality of turns and when electric current is supplied thereto the flow of current in the windings in the two grooves is in the opposite direction so that the ribs 44 assume opposite magnetic plurality. The end connections of the windings are connected to terminal pieces indicated at 47 and mounted on the end closure 40. If desired one end may be connected to the body of the pump/injector in which case only a single connector is required.

The extent of movement of the armature under the action of the spring 38 is limited by the abutment of the armature with the end closure and furthermore, the armature is retained against angular movement by means of a locating member 48 which is secured to the rod at its end adjacent the piston and which extends through an aperture in the armature.

The pump injector also incorporates a transducer for providing an indication of the position of the armature. The transducer comprises a core member 49 which is located about the rod 43 at the end thereof adjacent the end closure 40. The core member is provided with a circumferential groove in which is located a winding 50 and the armature mounts a ring 51 formed from magnetizable material and which as the armature moves, alters the reluctance of the magnetic circuit formed by the core and ring thereby altering the inductance of the winding 50.

The operation of the pump/injector will now be described assuming that the various parts are in the position shown in the drawing. In this position and as will be explained, the cylinder 25 is completely filled with fuel and the valve head 28 is in contact with its seating. When the windings 46 are supplied with electric current the armature moves downwardly against the action of the spring 38. The fuel in the cylinder is therefore pressurized by the piston 26 and this pressure acts upon the head 16 of the valve member 15. When the pressure is sufficient the head 16 is lifted from its seating against the action of the spring 20 and fuel flows from the nozzle head, the fuel being atomised during its passage past the valve head. The flow of fuel continues until the piston engages with the valve element 27. As soon as the head 28 of the valve element is lifted from its seating against the action of the spring 31, the pressure of fuel in the cylinder falls so that within the chamber 33. There is, therefore a rapid reduction in the pressure of fuel acting on the valve head 16 and the spring 20 moves the valve head into contact with its seating so that further flow of fuel and in particular unatomised fuel is prevented from leaving the nozzle head. The piston will continue to move downwardly until the part 37 engages with the end of the valve mounting. It has already been mentioned that the presented faces of the ribs 44 and 45 are inclined to the axis of the pump/injector. The purpose of such inclination is to obtain a more linear force/distance characteristic during movement of the armature. The supply of current to the windings may be cut off or reduced before the piston reaches the end of its stroke, the stroke of the piston being completed due to the inertia of the moving parts.

When the winding is de-energised the spring 38 will effect upward movement of the piston and the armature. During such movement it can be expected that the pressure within the cylinder will be lower than that in the chamber 33, and the effect is that the valve head 28 is maintained off its seating by the pressure of fuel in the chamber 33 acting on the valve head. If the maximum volume of fuel is required then the piston is allowed to move its maximum distance under the action of the spring 38 and once movement of the piston has halted and the pressure within the cylinder has become substantially the same as that within the chamber 33, the valve element moves under the action of the spring 31 to the closed position. The pump/injector is then ready for a further delivery of fuel.

If it is required that the pump/injector should deliver less than its maximum volume of fuel then the return motion of the armature under the action of the spring 38 must be halted at some intermediate position. The aforesaid transducer provides a signal indicative of the position of the armature and therefore the piston, and using this signal it is possible to partly energise the windings when the piston has moved by the required amount. Such partial energisation of the windings creates sufficient force to hold the armature against the action of the spring 38 but does not pressurise the fuel in the cylinder by an amount sufficient to effect opening of the valve member 15 in the nozzle head. It will be apparent that the filling of the cylinder can take place at any time after the termination of fuel delivery and before the next delivery of fuel is required. It must be remembered however, that filling of the cylinder does take a finite time and therefore it if is decided to fill immediately before delivery of fuel is required, sufficient time must be allowed for filling to take place.

Referring now to FIG. 2 and in which parts which have the same function are provided with the same reference numerals as those parts of FIG. 1.

The pump/injector of FIG. 2 has a different form of nozzle head and in which the valve member opens inwardly as opposed to outwardly as in the example of FIG. 1. In FIG. 2 the nozzle head is indicated at 54 and it comprises a stepped body 55 in which is formed a cylindrical blind bore. The bore at the narrower end of the body defines a seating for engagement by the conical end of a valve member 56. The narrower and projecting portion of the body 55 defines outlet orifices 57 and the flow of fuel through these orifices is controlled by the valve member and takes place when the valve member is lifted from the seating. Formed in the wall of the bore in the body 55 is a circumferential groove 58 and this communicates by way of cooperating passages in the body 55 and also in the body 11, with a chamber 59 which accommodates the spring 31.

A further chamber 60 is provided and this contains a coiled compression spring 61 which is engaged with one end wall of the chamber and has its other end engaging with a spring abutment 62 which itself is located upon a reduced portion of the valve member 56. The chamber 60 communicates with the chamber 33 by way of a passage 63 and a branch passage extends from this passage to the portion 30 of the bore in the valve mounting 24.

In operation, when the piston 26 moves downwardly fuel under pressure acts upon a step defined on the valve member 56 and lifts same against the action of the spring 61. Flow of fuel therefore takes place through the orifices 57 and this flow of fuel continues until the piston 26 lifts the valve head 28 from its seating.

FIG. 2 is only a diagrammatic illustration of the modification and in practice the nozzle head will probably be retained upon the body 11 by means of a retaining nut as in the example of FIG. 1. This also applies to the arrangement shown in FIG. 3 which is essentially the same as the arrangement shown in FIG. 2 with the exception that a different form of nozzle head is provided. In this case the valve member 64 is of the so called "pintle" type which again in the closed position co-operates with a seating but which in the open position, has a reduced portion extending with clearance through a hole disposed at the end of the bore in the nozzle head. When the valve member is lifted fuel flows through the aforesaid clearance.

In some engine applications particularly with the form of nozzle seen in FIG. 1, it may be possible to dispense with the requirement to reduce the pressure at the end of the pumping stroke in this case a simple one way valve is provided to admit fuel into the pumping chamber when the piston is moved by the action of the spring 38.

Figure 6:
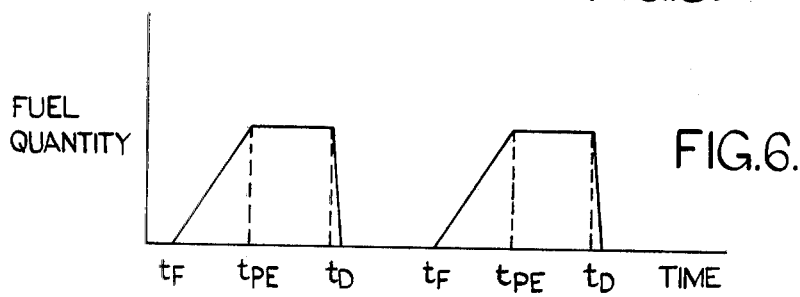
FIG. 6 is a graph to explain the basic concept of its fuel system.

Turning now to FIG. 6, two delivery cycles of the pump/injector are shown. Delivery of fuel to the associated engine takes place at times $t_D$ and this is effected by energising the winding 46 at full power. Following the time $t_D$ there is a period during which the winding 46 is maintained in an energised condition so that the piston remains at its innermost position. At the end of this period at time $t_F$, the winding is de-energised to allow the spring 38 to effect outward movement of the piston. Fuel flows into the pumping chamber and a measure of the amount of fuel flowing into the pumping chamber is obtained by sensing the displacement of the piston using the transducer or by measuring the inductance of the winding 46. When the desired amount of fuel has entered the pumping chamber the winding 46, or a separate winding is partly energised. This occurs at times $t_{PE}$ as shown in FIG. 6. The partial energisation of one or other of the windings is sufficient to prevent further movement of the piston under the action of the spring but is insufficient to generate sufficient pressure within the pumping chamber to cause opening of the valve member of the nozzle. The volume of fuel in the pumping chamber therefore remains constant until time $t_D$ when delivery of fuel takes place. The separate winding (not shown in FIG. 1) is provided in the electromagnetic means for the sole purpose of arresting the movement of the piston.

Figure 4:
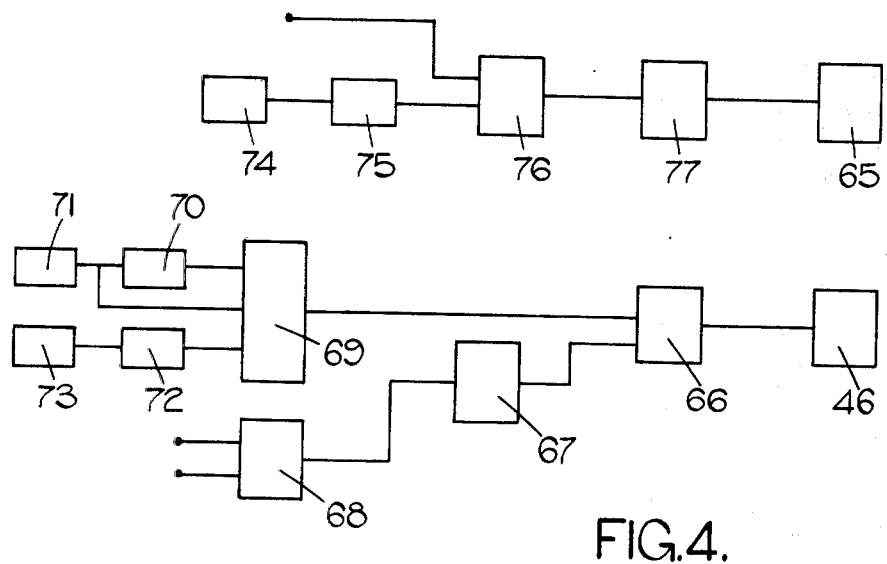
FIG. 4 is a block diagram of a control system for the pump/nozzle of FIG. 1.

Turning now to FIG. 4 which shows a control system for controlling the operation of the pump/injector, the winding 46 is shown as also in the aforesaid separate winding which is referenced 65. The winding 46 is supplied with current when a signal appears at the output of a circuit 66 which has two inputs one of which is connected to a circuit 67 which determines the desired timing of delivery of fuel i.e. the time $t_D$ in FIG. 6. For this purpose the circuit 67 is supplied with the output of a circuit 68 in which is stored information regarding the timing characteristics of the associated engine. The circuit 68 is supplied with an engine speed signal and also a signal representing the amount of fuel to be supplied to the engine. The other input of the circuit 66 is connected to a circuit 69 which provides a signal indicative of the position of the rotary parts of the engine and at the desired engine position, the winding 46 is energised to effect delivery of fuel. The winding 46 is maintained in its energised state for the period of time $t_D-t_F$ in FIG. 6, by the circuit 66.

The engine position signal is provided by the circuit 69 which receives an engine speed signal from a decoding circuit 70 which in turn receives a pulse input from a transducer 71 which is positioned adjacent a rotary part of the engine such that in the particular example four pulses are provided per revolution of the engine. These pulses are also fed to the circuit 69 as also is a pulse signal from a shaping circuit 72 having its input connected to a transducer 73. This transducer provides a pulse signal every two revolutions of the engine. From these signals an engine position signal is produced.

When point $t_F$ is reached the piston starts to draw fuel into the pumping chamber and an indication of the movement of the piston is provided by the transducer indicated at 74, contained within the pump/injector. The signal from the transducer 74 is supplied to a decoding circuit 75 and then to one input of a comparator 76. The other input of the comparator is supplied with a signal representing the demanded fuel and the derivation of this signal will be explained later. When the actual fuel signal obtained at the output of the decoder 75 equals the demanded fuel signal, a signal is supplied to a circuit 77 which then supplied the winding 65 with electric current and further movement of the plunger is halted. In FIG. 6 the winding 65 is energised at points tPE.

As soon as winding 46 is energised movement of the piston takes place and the signal from the decoding circuit 75 then becomes less than the demanded fuel signal so that the winding 65 is de-energised.

If the holding winding 65 is not provided then the output of the circuit 77 is connected to the winding 46. The current supplied to the winding 46 for the purpose of preventing movement of the plunger against the action of the spring will of course be less than that required to cause delivery of fuel. Moreover, in the periods $t_D$–$t_F$ it may be necessary to reduce the current supplied to the winding to avoid overheating of the winding and to minimise power consumption.

Figure 5:
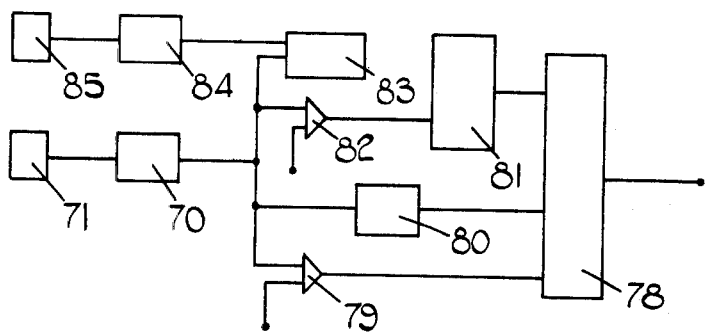
FIG. 5 is a block diagram of an electronic two speed governor.

Reference will now be made to FIG. 5 which shows a circuit for providing the demanded fuel signal to the comparator 76 and the circuit 68. The circuit of FIG. 5 provides a two speed governing effect and includes a lowest wins circuit 78 the output of which constitutes the fuel demand signal. The circuit 78 has three inputs the lowest of which is selected by the circuit for supply as the fuel demand signal.

One input of the circuit 78 is connected to the output of a high gain amplifier 79 provided with feedback. One input of the amplifier is provided with a reference signal representative of the maximum allowed engine speed whilst the other input is supplied with the actual engine speed signal from a decoding circuit shown as the decoding circuit 70 of FIG. 3.

The second input of the circuit 78 is connected to a circuit 80 which also receives the speed signal and provides a signal representing the maximum fuel signal throughout the speed range of the engine.

The third input of the circuit 78 is connected to the output of a high wins circuit 81 which has two inputs. The first input is connected to the output of a high gain amplifier 82 provided with feedback and having two inputs one of which receives a reference signal representing the desired engine idling speed and the other of which receives the engine speed signal. The second input of the circuit 81 is connected to the output of a shaping circuit 83 which receives the engine speed signal and also a signal from a decoding circuit 84 which in turn receives a signal from a transducer 85 associated with an engine operator adjustable control e.g. the throttle pedal in the case of a road vehicle.

In operation at engine idling speeds the amplifier 82 is operative to determine the demanded fuel signal at the output of the circuit 78 since with no demand on the part of the operator, the output from the amplifier will be larger than the output from the shaping circuit 83 but smaller than the output of the circuit 80 and the amplifier 79. When the operator places a demand on the engine by depressing the throttle pedal, then the output of the shaping circuit becomes higher than the output of the amplifier. If only a small demand is made then the signal from the circuit 81 will still be lower than those provided by the circuit 80 and the amplifier 79. Hence the driver will control directly the amount of fuel supplied to the engine and with an increased flow of fuel the engine will accelerate. If the operator makes a large demand on the engine then it is likely that the output of the circuit 81 will be greater than the output of the circuit 80 in which case the rate of fuel supply will be controlled by the circuit 80 until the output of the circuit 81 becomes smaller thereby restoring the control of the fuel supply to the operator. If the maximum allowed engine speed is attained then the output of the amplifier 79 becomes less and the fuel supply to the engine will be reduced to control the speed of the engine. The shaping circuit 83 is arranged to modify the apparent demanded fuel in accordance with increases in the engine speed to provide feedback to the operator of the engine. Furthermore, the idling speed may be modified in accordance with variation in low fuel demand on the part of the operator. This provides a smooth transition from the control by the amplifier 82 to the control by the circuit 83 and eliminates "lost motion" in the operator adjustable control.

The governor circuit may be modified in many ways to provide for example, a change in the idling speed with engine temperature, modification of the maximum fuel delivery in accordance with the ambient air pressure and or temperature, modification of the maximum fuel delivery with the pressure in the air inlet manifold of the engine, additional fuel for starting the engine when cold and modification of the fuel level for starting when the engine is hot.

FIG. 5 shows a two speed governor arrangement for providing the fuel demand signal. It will be understood that the circuit of FIG. 5 may be replaced by an all speed governor circuit or an isochronous governor circuit.

In addition the control system as described with reference to FIG. 4 may be utilised to provide ignition control signals when the associated engine is a spark ignition engine. The timing of delivery of fuel may also be modified for starting purposes in accordance with the engine temperature.

In the system as described the time during which delivery of fuel takes place is a function of the power input to the winding 46. The time of delivery of fuel may therefore be varied by variation of the power input to the winding. This can be varied in accordance with the engine speed. In one arrangement the supply of power to the winding is in the form of current pulses and in order to vary the power input, the pulse rate or the pulse height may be varied. Conveniently when energising the winding to effect delivery of fuel an initial large pulse is supplied to the winding to obtain rapid initial movement of the various parts, followed by a series of small pulses and it is these pulses which would be altered to obtain variation in the delivery period.

It will be understood that the delivery of fuel does not take place immediately the winding is energised. There are a number of reasons for this and this resultant delay must be taken into account when determining the required timing of delivery. When the winding is energised the current and therefore the magnetic flux takes time to rise to a value at which the armature starts to move. In addition, before delivery of fuel can take place the fuel in the pumping chamber must be pressurized a sufficient amount to cause the valve head 16 in the case of FIG. 1, to be lifted from its seating. Moreover, the supply of current to the winding 46 is reduced before the end of the stroke of the piston. The piston continues to move due to its inertia and also because the magnetic flux does not fall immediately the supply of current is halted. It must also be realized that when the winding is de-energised prior to filling the pumping chamber with fuel, the flux does not die away immediately and this will slow the initial movement of the piston under the action of the spring 38.

We claim:

1. A fuel system for an internal combustion engine of the type in which fuel is injected into a combustion space of the engine, the system being of the kind comprising an injection nozzle positioned on the engine so that fuel delivered to the nozzle will be injected into the combustion space and an injection pump for delivering fuel to the nozzle in timed relationship with the engine, the pump comprising a piston movable in a bore to vary the size of a pumping chamber, resilient means biasing the piston in a direction to increase the size of the pumping chamber, electromagnetic means operable to move the piston against the action of the resilient means to displace fuel from the pumping chamber through the associated nozzle, a valve controlled fuel inlet to said pumping chamber and through which fuel can flow into the bore from a source of fuel when the piston is moved by the action of the resilient means, the system including first electronic means for supplying power to the electromagnetic means for a period of time during which the piston is moved to deliver fuel from the pump, the electromagnetic means at the end of said period of time being de-energised to allow return movement of the piston under the action of the resilient means and second electronic means operable to supply a holding current to said electromagnetic means to halt the return movement of said piston after the required amount of fuel has been drawn into the pumping chamber.

2. A fuel system according to claim 1 in which said second electronic means includes a comparator to which signals are supplied indicative of the desired volume of fuel and the actual volume of fuel in the pumping chamber, said comparator producing an output when said signals are equal.

3. A fuel system according to claim 2 in which the signal indicative of the actual quantity of fuel in the pumping chamber is provided from a transducer associated with a part movable with the piston.

4. A fuel system according to claim 3 including third electronic means for providing a signal representing the desired volume of fuel to said comparator, said third electronic means comprising a governor circuit.

5. A fuel system according to claim 4 in which said first electronic means includes a comparator to which is supplied a signal indicative of the engine position and a further signal indicative of the desired timing of delivery of fuel.

6. A fuel system according to claim 5 including circuit means to which an engine speed signal and a desired fuel quantity signal are supplied, said circuit means calculating from said signals the desired timing of delivery of fuel to the combustion space of the engine.

7. A fuel system according to claim 6 including means for modifying the power supplied to the electromagnetic means during delivery of fuel to the combustion space.

* * * * *